UNITED STATES PATENT OFFICE.

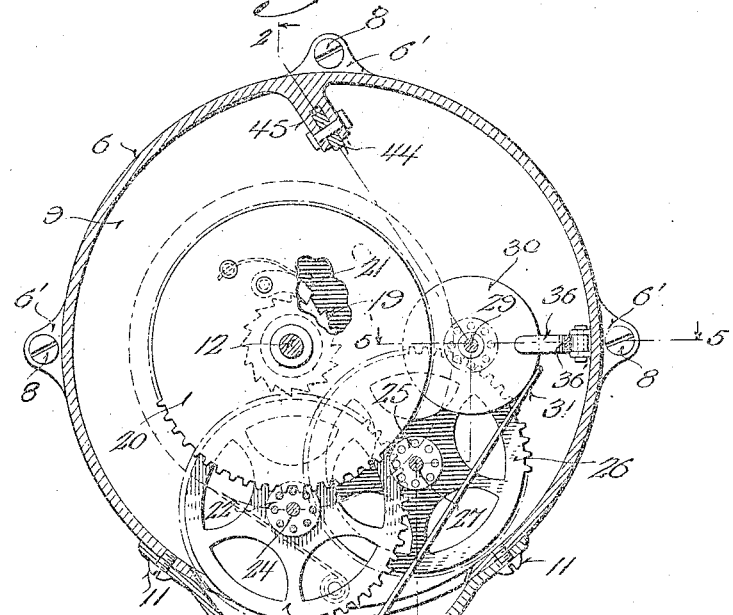

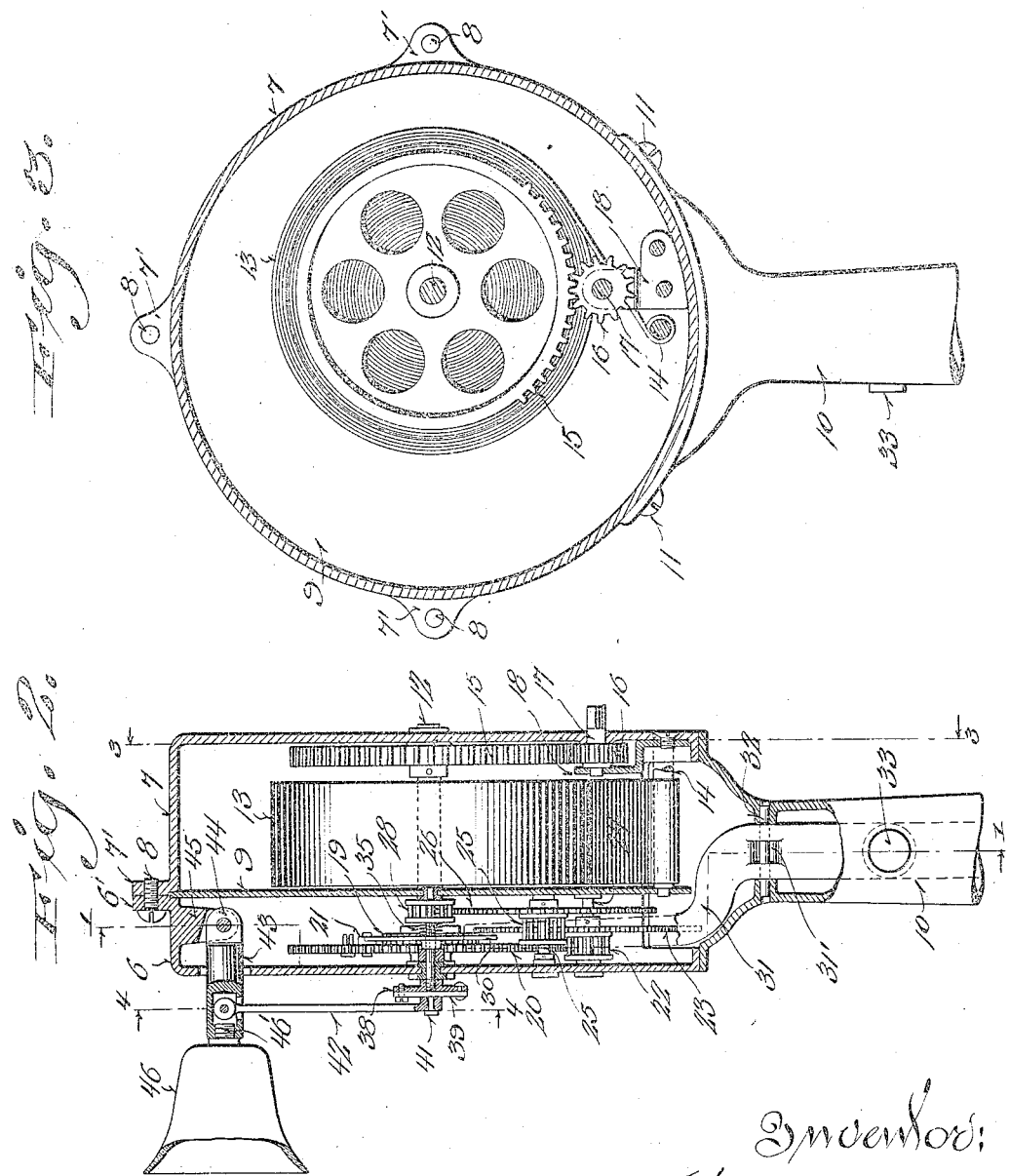

WILLIAM J. STEVENSON, OF MILWAUKEE, WISCONSIN.

MASSAGING IMPLEMENT.

1,237,570.     Specification of Letters Patent.     Patented Aug. 21, 1917.

Application filed October 1, 1915. Serial No. 53,503.

*To all whom it may concern:*

Be it known that I, WILLIAM J. STEVENSON, a citizen of the United States, and resident of Milwaukee, in the county of Milwaukee and State of Wisconsin, have invented certain new and useful Improvements in Massaging Implements; and I do hereby declare that the following is a full, clear, and exact description thereof.

My invention consists in what is herein particularly set forth with reference to the accompanying drawings and pointed out in the claims of this application, its object being to provide simple, economical and efficient mechanical power massaging implements designed for interchangeable applicators and for ready regulation of their vibratory range and speed.

Figure 1 of the drawings represents a partly sectional elevation of a mechanical power massaging implement in accordance with my invention, the section being indicated by line 1—1 in the next described figure;

Fig. 2, a similar view indicated by line 2—2 in Fig. 1, the handle of the implement being partly broken away;

Fig. 3, another partly sectional view of the implement having its handle broken away, the view being indicated by line 3—3 in Fig. 2;

Fig. 4, an elevation of a detail of the implement partly in section on line 4—4 in Fig. 2, and Fig. 5, a sectional view of another detail of the implement indicated by line 5—5 in Fig. 1.

Referring by numerals to the drawings, 6 indicates one, and 7 another section of a two part circular casing. Registering lugs 6', 7', of the casing-sections are engaged by connecting screws 8, and a partition 9 is provided in the casing. A flanged hollow handle 10 is held by screws 11 in connection with the casing, and a peripheral opening in said casing registers with the bore of the handle.

Journaled in the sides of the casing and extending through the partition 9 is a main arbor 12 to which is fastened one end of a coil-spring 13, that has its other end fastened to a rod 14 crossing a compartment of the casing, the spring being the motor of the implement herein specified. Fast on the main arbor 12, is a spur-wheel 15 in mesh with a pinion 16 fast on an arbor 17 that is journaled in the casing-section 7 and a bracket 18 fastened to said casing-section inside of the same. The arbor 17 has an angular outer end upon which to fit a winding-key or crank, it being understood that the spring 13 is wound as a result of rotation of said pinion in the proper direction. The main arbor is eccentric to the casing to provide for unwind of the spring to one side of said arbor without crowding in said casing. A ratchet-wheel 19 is fast on the main arbor in another compartment of the casing from that occupied by the spring and its winding-gear, and loose on the hub of the ratchet-wheel is a spur-wheel 20 having a spring-controlled detent 21 pivoted thereto and in engagement with said ratchet-wheel.

The spur-wheel 20 meshes with a lantern-wheel hub 22 of a spur-wheel 23 fast on an arbor 24 journaled in the casing-section 6 and the partition 9. The spur-wheel 23 meshes with the lantern-wheel hub 25 of another spur-wheel 26 fast on an arbor 27 journaled in the casing-section 6 and partition 9, and the spur-wheel 26 meshes with a lantern-wheel 28 fast on a spindle 29 having its bearings in said casing-section and partition.

Within the casing a brake-wheel 30 is fast on the spindle 29, and a spring-controlled brake-lever 31 is normally in contact with the periphery of said wheel. A portion of the brake-lever is shown offset from the remainder thereof to form an eye 31', and fast in the eye is a fulcrum pin 32 for which bearings are provided in the handle aforesaid. A button 33 on the brake-lever extends through an aperture in the adjacent handle, and the spring 34 attached at one end to said lever has its other end in contact with said handle, said spring being under tension.

The brake-wheel 30 is splined on the spindle 29 in opposition to a spring 35 that abuts the lantern-wheel 28, and opposing the outer side of said wheel is a pivotal friction-dog 36, having a lug 36' opposing a screw 37 adjustable in the casing-section 6. By means of the screw, the friction-dog may be set in contact with the brake-wheel to more or less retard the rotary speed of the spindle therewith when the brake-lever is retracted from said wheel, said spindle being driven by the power of the main-spring through the medium of the gear-train above specified.

The spindle 29 extends outside of the casing-section 6, and its outer end is fast in a cross-head 38. One end of a plate 39 is pivotally connected to an end of the cross-head, and a segmental slot in the other end of the plate is engaged by a set-screw 40 with which the adjacent end of the crosshead 38 is provided. The plate 39 is preferably of triangular shape, its apex being pivoted to the crosshead 38, and intermediate of its ends said plate has wrist-pin connection 41 with one end of a pitman 42, the other end of the pitman being pinned in a longitudinally slotted socket bar 43 that extends through a play aperture in the casing-section 6, its inner end being flattened at 44 for pivotal connection with a casing-lug 45. The outer end of the socket bar is screw-tapped for the engagement of the screw-threaded shank 46' of an applicator 46, the applicator shown being of vacuum-cup form, but any suitable form of applicator may be employed without departure from the scope of my invention, as herein claimed. It is also within the scope of my invention to vary the details of the mechanism above specified without change of result or departure from the scope of what is claimed herein.

The main spring 13 being wound and the brake-lever 31 actuated to hold it away from the brake-wheel 30 against resistance of the spring 34, there is expansion of said main spring to drive the main arbor 12, whereby the gear-train, above specified in detail, is driven to impart rotary motion to the spindle 29 at a speed depending upon the friction of dog 36 upon said brake-wheel.

By means of the crosshead 38 of the spindle 29, the plate 40 therewith, and the pitman 42, vibratory motion is imparted to the pivoted socket 42 carrying an applicator, the range of vibration being determined by the adjustment of said plate.

I claim:

In a vibrator massaging implement, the combination of a hollow casing, a hollow handle connected with the casing and communicating therewith, an applicator holder pivoted to the casing, a shaft journaled in the casing and connected with the said holder for oscillating it, a spring motor in the casing connected with the shaft, a brake wheel in the casing connected with the shaft and a pivoted brake lever associated with the said brake wheel and extended into the handle.

In testimony that I claim the foregoing I have hereunto set my hand at Milwaukee, in the county of Milwaukee and State of Wisconsin, in the presence of a witness.

WILLIAM J. STEVENSON.

Witness:
　M. E. DOWNEY.

Copies of this patent may be obtained for five cents each, by addressing the "Commissioner of Patents, Washington, D. C."